United States Patent Office 3,074,939
Patented Jan. 22, 1963

3,074,939
10-(2-MORPHOLINOETHOXYACETYL) PHENO-THIAZINE AND ITS PREPARATION
Martin A. Davis, Montreal, Quebec, Canada, assignor to American Home Products Corporation, New York, N.Y., a corporation of Delaware
No Drawing. Filed June 26, 1961, Ser. No. 119,281
3 Claims. (Cl. 260—243)

This invention is directed to a new chemical compound, 10-(2-morpholinoethoxyacetyl)phenothiazine, and to its inorganic acid salts, more especially its sulfate salt.

This novel compound, both in base and salt forms, is active as an antitussive agent, being characterized by a low order of toxicity; and it also has a low order of local anesthetic activity. It may be administered in the form of one of its water-soluble salts in solid dosage forms such as tablets or capsules. Such tablets or capsules may advantageously contain excipients such as lactose, for example; disintegrating agents such as starch, for example; and lubricants such as magnesium stearate, for example. It may also be administered in liquid preparations, such as syrups, which preparations may advantageously contain expectorant and secretolytic additives, such dosage forms to contain from 20 to 100 mg. of the active ingredient per dosage unit.

My invention is also concerned with a process whereby these compounds may be readily prepared from available starting materials.

In preparing 10-(2-morpholinoethoxyacetyl)phenothiazine it is advantageous to utilize 10-(2-chloroethoxyacetyl)phenothiazine as starting material. When this compound is reacted with morpholine in accordance with the procedure hereinafter described, the novel compound results and may, if desired, be converted to salt forms.

The starting material, 10-(2-chloroethoxyacetyl)phenothiazine, is readily prepared by a method similar to known procedures from 2-chloroethoxyacetic acid. By treatment with thionyl chloride, following the method of Salmi, Leimu and Kallio, Suomen Kemistilehiti, volume 17B, page 17 (1944), 2-chloroethoxyacetic acid is converted to 2-chloroethoxyacetyl chloride in high yield. When phenothiazine in an inert organic solvent, such as benzene, is brought into contact with 2-chloroethoxyacetyl chloride in the presence of an acid acceptor such as pyridine, the desired starting material, 10-(2-chloroethoxyacetyl)phenothiazine, results.

In preparing my novel pharmacologically active compound, the starting material, i.e. 10-(2-chloroethoxyacetyl)phenothiazine, and morpholine are brought together, preferably in the proportion one mole of the former to two moles of morpholine, in an inert organic solvent such as dry benzene. The reactants are advantageously heated to an elevated temperature, one above room temperature such as one corresponding to reflux temperature, being preferred. After several hours, when the reaction is relatively complete, the reaction mixture may be cooled, filtered to remove morpholine hydrochloride, and the inert organic solvent layer extracted with a dilute acid, such as dilute hydrochloric acid. This results in extraction of the 10-(2-morpholinoethoxyacetyl)phenothiazine product which, when the acid extractant is made alkaline by addition of an alkali, is precipitated therein and may be removed by filtration.

The solid product may be purified in the usual manner by dissolving it in a suitable solvent, such as mixed isopropanol-hexane, followed by recrystallization from the solution. If desired several such recrystallizations may be employed.

When preparing acid salts of 10-(2-morpholinoethoxyacetyl)phenothiazine, such as the sulfate salt, an ethereal solution of the base may be treated with a small molar excess of the concentrated acid. The product may be recovered and recrystallized from a solution of the salt in a suitable mixed solvent, such as ethanol-ether, thereby securing the acid salt in the substantially pure state.

The process of preparing 10-(2-morpholinoethoxyacetyl)phenothiazine may be represented as follows:

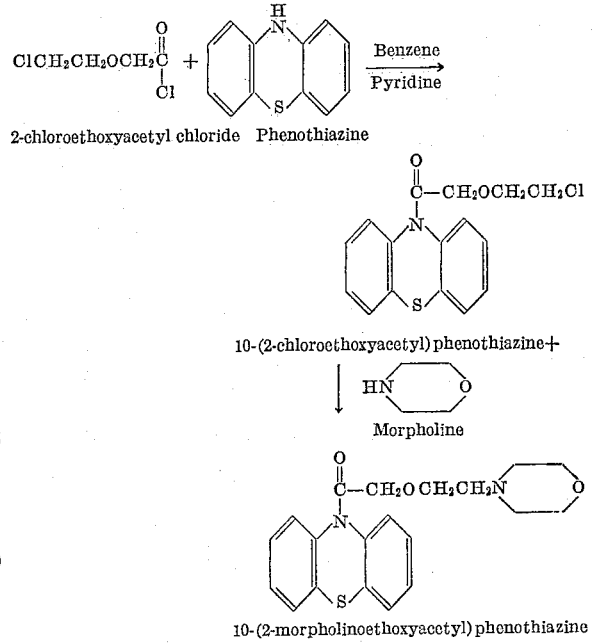

Further details of my process for the preparation of this relatively non-toxic antitussive agent will be found in the illustrative examples which follow:

EXAMPLE 1

*10-(2-Chloroethoxyacetyl)Phenothiazine*

2-chloroethoxyacetic acid was converted to the corresponding acetyl chloride, 2-chloroethoxyacetyl chloride, in 92% yield by treatment with thionyl chloride following the method of Salmi, Leimu and Kallio, Suomen Kemistilehiti, 17B, 17 (1944) (Chem. Abstr. 40, 6491).

A solution of 2-chloroethoxyacetyl chloride (10.0 g., 0.064 mole) in dry benzene (20 ml.) was added slowly to a mixture of phenothiazine (12.0 g., 0.060 mole) and dry pyridine (4.75 g., 0.060 mole) in benzene (60 ml.). The solution was stirred for one-half hour at room temperature, and this was followed by heating under reflux for fifty minutes. The mixture was filtered hot and the filtrate was evaporated leaving a dark oil. This oil was treated with charcoal in benzene-hexane mixture and the product recrystallized from ethyl acetate-hexane. There was obtained 8.3 g. (43% yield) of 10-(2-chloroethoxyacetyl)phenothiazine; M.P. 93–94° C.

Analysis confirmed the empiric formula, $$C_{16}H_{14}ClNO_2S$$

Required: C, 60.08; H, 4.41; Cl, 11.09%. Found: C, 59.23; H, 4.19; Cl, 11.28, 11.23%.

EXAMPLE 2

*10-(2-Morpholinoethoxyacetyl)Phenothiazine*

A solution of the chloroethoxyacetyl phenothiazine described in Example 1 (7.6 g., 0.024 mole) and morpholine (4.2 g., 0.048 mole) in dry benzene (50 ml.) was heated under reflux for eighteen hours. The morpholine hydrochloride was removed from the cooled solution by filtration and the benzene layer was extracted with dilute hydrochloric acid. The acid layer was then washed with ether and made alkaline. The solid obtained (4.1 g.) was recrystallized from isopropanol-hexane to furnish a sample of the base, 10-(2-morpholinoethoxyacetyl)phenothiazine; M.P. 78–79° C. Treatment of an ethereal solution of this product with a small molar excess of concentrated sulfuric acid with subsequent recrystallization of the product from ethanol-ether gave the sulfate salt of 10-(2-morpholinoethoxyacetyl)phenothiazine; M.P. 124–126° C. (decomp.).

Analysis confirmed the empiric formula, $$C_{20}H_{24}N_2O_7S$$

Required: C, 51.28; H, 5.16; N, 5.98; S, 13.69%.
Found: C, 50.95; H, 5.10; N, 5.87, 5.90; S, 13.50, 13.75%.

I claim:

1. A compound selected from the group which consists of 10-(2-morpholinoethoxyacetyl)phenothiazine and its sulfate salt.

2. 10-(2-morpholinoethoxyacetyl)phenothiazine.

3. The sulfate salt of 10-(2-morpholinoethoxyacetyl)phenothiazine.

References Cited in the file of this patent

UNITED STATES PATENTS

| | | |
|---|---|---|
| 2,778,824 | Von Seemann et al. | Jan. 22, 1957 |
| 2,989,529 | Schuler | June 20, 1961 |

FOREIGN PATENTS

| | | |
|---|---|---|
| 662,903 | Great Britain | Dec. 12, 1951 |

OTHER REFERENCES

Hromatka et al.: Monatshefte für Chemie, volume 88, pages 1077–1086 (1957).

Chappel et al.: Canadian J. Biochem. and Physiol., volume 36, pages 475–481 (1958).